United States Patent [19]

Shimura

[11] Patent Number: 5,086,489
[45] Date of Patent: Feb. 4, 1992

[54] METHOD FOR COMPRESSING IMAGE SIGNALS

[75] Inventor: Kazuo Shimura, Kanagawa, Japan

[73] Assignee: Fuji Photo Film Co., Ltd., Kanagawa, Japan

[21] Appl. No.: 726,133

[22] Filed: Jul. 3, 1991

Related U.S. Application Data

[63] Continuation of Ser. No. 511,359, Apr. 19, 1990, abandoned.

[30] Foreign Application Priority Data

Apr. 20, 1989 [JP] Japan .................................. 1-101341

[51] Int. Cl.$^5$ .............................................. G06K 9/00
[52] U.S. Cl. ...................................... 382/56; 358/136
[58] Field of Search ................... 382/56, 6, 47, 44, 45, 382/42; 250/555; 358/445, 428, 137, 138, 136; 364/413.16, 413.18

[56] References Cited

U.S. PATENT DOCUMENTS

| 4,258,264 | 3/1981 | Kotera et al. ............... 250/484 |
| 4,641,242 | 2/1987 | Kimura ........................... 382/6 |
| 4,776,029 | 10/1988 | Shimura ........................ 382/56 |
| 4,941,194 | 7/1990 | Shimura ........................ 382/56 |

FOREIGN PATENT DOCUMENTS 56-11395 2/1981 Japan .

Primary Examiner—Michael Razavi
Assistant Examiner—Yon Jung
Attorney, Agent, or Firm—Sughrue, Mion, Zinn, Macpeak & Seas

[57] ABSTRACT

Original image signal components representing an image are subjected to component number decreasing processing wherein, along each of block lines which are set in parallel on an image, blocks each comprising a single picture element in the image are set at predetermined intervals, or blocks each comprising several picture elements are set continuously or at predetermined intervals, such that the phases of the blocks located along a block line are shifted from the phases of the blocks located along a neighboring block line. Only the respresentative image signal components determined from the image signal components representing the picture elements in the respective blocks are sampled as new image signal components. The new image signal components are classified into main components, which have been sampled at appropriate sampling intervals, and interpolated components other than the main components. The interpolated components are subjected to interpolation prediction encoding processing based on the main components.

7 Claims, 7 Drawing Sheets

FIG. 5

| $a_{11}'$ | | $\Delta a_{12}$ | | $\Delta a_{13}$ |
|---|---|---|---|---|
| | | | | |
| $a_{21}'$ | | $\Delta a_{22}$ | | $\Delta a_{23}$ |
| | | | | |
| $a_{31}'$ | | $\Delta a_{32}$ | | $\Delta a_{33}$ |

FIG. 6

| $(a_{11}')$ | $\Delta b_{11}$ | $(a_{12}')$ | $\Delta b_{12}$ | $(a_{13}')$ |
|---|---|---|---|---|
| $\Delta c_{11}$ | $\Delta d_{11}$ | $\Delta c_{12}$ | $\Delta d_{12}$ | |
| $(a_{21}')$ | $\Delta b_{21}$ | $(a_{22}')$ | $\Delta b_{22}$ | $(a_{23}')$ |
| $\Delta c_{21}$ | $\Delta d_{21}$ | $\Delta c_{22}$ | $\Delta d_{22}$ | |
| $(a_{31}')$ | $\Delta b_{31}$ | $(a_{32}')$ | $\Delta b_{32}$ | $(a_{33}')$ |

FIG. 10

| $a_{11}$ | $(A_{12})$ | $b_{11}$ | | $a_{12}$ | | $b_{12}$ |
|---|---|---|---|---|---|---|
| | $(A_{22})$ | $(A_{23})$ | | | | |
| | $c_{11}$ | $(A_{33})$ | $d_{11}$ | | $c_{12}$ | |
| | | | | | | |
| $a_{12}$ | | $b_{12}$ | | $a_{22}$ | | $b_{22}$ |

FIG. 11
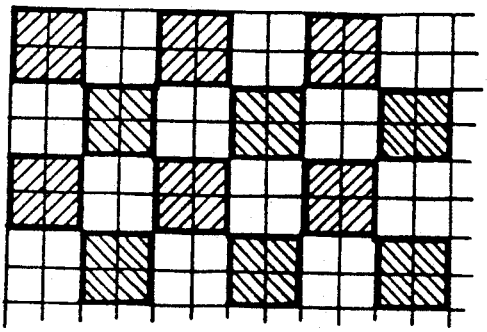
FIG. 12
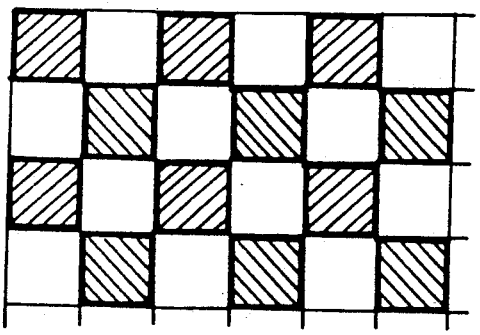
FIG. 13
| $a_{11}$ | $b_{11}$ | $a_{12}$ | $b_{12}$ | $a_{13}$ | $b_{13}$ |
|---|---|---|---|---|---|
| $c_{11}$ | $d_{11}$ | $c_{12}$ | $d_{12}$ | $c_{13}$ | $d_{13}$ |
| $a_{21}$ | $b_{21}$ | $a_{22}$ | $b_{22}$ | $a_{23}$ | $b_{23}$ |
| $c_{21}$ | $d_{21}$ | $c_{22}$ | $d_{22}$ | $c_{23}$ | $d_{23}$ |

METHOD FOR COMPRESSING IMAGE SIGNALS

This is a continuation of application Ser. No. 07/511,359 filed Apr. 19, 1990 and now abandoned.

BACKGROUND OF THE INVENTION

1. Field of the Invention

This invention relates to a method for compressing an image signal, which carries gradation, with interpolation encoding processing.

2. Description of the Prior Art

In recent years, image signals carrying gradation are stored in the form of digital signals on a storage medium, such as an optical disk. When necessary, a digital signal is read from the storage medium and used in the reproduction of a visible image on a cathode ray tube (CRT) or the like. Also, an image signal is transmitted in the form of digital signals between facsimile devices, or the like, and a visible image is reproduced from the received image signal on the signal receiving side.

In cases where an image signal is stored or transmitted in the form of a digital signal, image signal compressing and extending techniques are employed so that the cost required for the digital image signal to be stored or transmitted can be kept low. With the image signal compressing and extending techniques, compression processing is carried out on a digital image signal in order to reduce its amount, and the compressed image signal is stored or transmitted. When an image is to be reproduced, a compressed image signal corresponding to the image is extended with extension processing. Thereafter, a visible image is reproduced from the extended image signal.

As on of methods for compressing image signals, an interpolation encoding method has heretofore been known as disclosed in, for example, U.S. Pat. No. 4,776,029. With the interpolation encoding method, image signal components of an image signal are classified into main components, which have been sampled at appropriate sampling intervals, and interpolated components other than the main components. The interpolated components are then subjected to interpolation prediction encoding processing based on the main components, i.e. the values of the interpolated components are predicted with the interpolation prediction from the main components. Thereafter, prediction errors between the predicted values and the actual values of the interpolated components are encoded into variable length codes, such as Huffman codes. In this manner, the image signal is compressed.

During the compression of an image signal, the image signal compressibility should be as high as possible. However, it is technically difficult to increase the compressibility markedly during the interpolation encoding. Therefore, in order for a high compressibility to be achieved, it is considered that component number decreasing processing, which results in a coarse spatial resolution, and the interpolation encoding be combined with each other.

If the number of the image signal components of an image signal is decreased and the spatial resolution becomes coarse, the image quality of a visible image reproduced from the resulting image signal will become bad. However, in the case of a certain type of image, for example, a radiation image of a human body, important image information falls within a low spatial frequency range. In such cases, even if the spatial resolution is made coarse and the high spatial frequency components are decreased, the image quality will not substantially become bad. Accordingly, in the case of such an image, the combination of the component number decreasing processing with the interpolation encoding can be employed during the compression of the image signal representing the image.

The component number decreasing processing and the interpolation encoding should be combined with each other such that the image quality of a reproduced visible image can be kept as good as possible and the signal compressibility can be kept as high as possible.

SUMMARY OF THE INVENTION

The primary object of the present invention is to provide a method for compressing an image signal wherein component number decreasing processing and interpolation encoding are combined with each other such that the signal compressibility can be kept as high as possible.

Another object of the present invention is to provide a method for compressing an image signal wherein component number decreasing processing and interpolation encoding are combined with each other such that the image quality of a reproduced visible image can be kept as good as possible, while the signal compressibility is kept high.

The present invention provides a method for compressing an image signal, wherein an original image signal is subjected to component number decreasing processing in which a phase shift sampling technique is employed, and an image signal obtained from said component number decreasing processing is subjected to interpolation encoding.

The term "component number decreasing processing" as used herein means the processing for decreasing the spatial resolution of an image, i.e. the processing for decreasing the number of the image signal components of an image signal representing an image. Specifically, with the component number decreasing processing, for example, the image signal components of an original image signal are alternately sampled, and the number of the image signal components is decreased to one half. Alternatively, the number of the image signal components is decreased to one fourth from an operation wherein the image is divided into a plurality of blocks each of which is composed of 2×2 picture elements, and only the representative image signal components, each of which is determined from the image signal components representing the four picture elements in each block, are sampled.

The term "phase shift sampling" as used herein means an embodiment of the component number decreasing processing, in which the phase of the sampling is varied between sampling lines. Specifically, a plurality of block lines are set in parallel on an image. Along each of the block lines, blocks each of which comprises a single picture element are set at predetermined intervals, or blocks each of which comprises a plurality of picture elements are set continuously or at predetermined intervals. The blocks are set such that the phases of the blocks located along a block line are shifted from the phases of the blocks located along a neighboring block line. A representative image signal component is determined from the image signal component representing the single picture element in each block in cases where each block comprises the single picture element, or is determined from the image signal components representing the picture elements in each block in cases where each block comprises the plurality of the picture elements. Only the representative image signal components corresponding to the blocks are sampled as new image signal components.

Also, the term "interpolation encoding" as used herein means the processing wherein image signal components of an image signal are classified into main components, which have been sampled at appropriate sampling intervals, and interpolated components other than the main components, and the interpolated components are then subjected to interpolation prediction encoding processing based on the main components. With the interpolation prediction encoding processing, the values of the interpolated components are predicted from the main components with the interpolation prediction using appropriate interpolation formulas. Thereafter, prediction errors between the predicted values and the actual values of the interpolated components are encoded into variable length codes (i.e. codes whose lengths vary in accordance with values), such as Huffman codes. Specifically, shorter codes are allocated to prediction error values which occurs more frequently, and longer codes are allocated to prediction error values which occurs less frequently. In this manner, redundancy of image signal components is suppressed, and the total amount of the image signal is decreased.

The main components may be sampled in one of various manners. It is only necessary that the main components be sampled from positions located sparsely, coarsely and approximately uniformly at predetermined intervals in the image.

The main components may not be subjected to any particular processing. Alternatively, for example, the main components may be compressed from an operation wherein the value of each main component is predicted from the value of a main component, which is previous to each said main component, and errors occurring during the prediction of the values of the main components are encoded into Huffman codes.

With the method for compressing an image signal in accordance with the present invention, the component number decreasing processing and the interpolation encoding are carried out during the compression of an image signal. During the component number decreasing processing, the phase shift sampling is carried out. Therefore, the image signal can be compressed to a higher extent than when the phases of the sampling points are not shifted. Also, the coarseness of a visible image reproduced from an image signal, which has been restored from the compressed image signal, can be kept visually less perceptible than when the phases of the sampling points are not shifted. In cases where a stationary grid was used during the recording of an image on a recording medium in order to prevent scattered light or radiation from impinging upon the recording medium, if the image signal components of the image signal detected from the recording medium are sampled with the same sampling phases during the compression of the image signal, a moire pattern will easily occur in a reproduced visible image. However, with the method for compressing an image signal in accordance with the present invention, such a moire pattern does not occur in the reproduced visible image. As described above, with the method for compressing an image signal in accordance with the present invention wherein the novel technique for combining the phase shift sampling and the interpolation encoding with each other is employed, the signal compressibility can be kept high, and the image quality of a reproduced visible image can be kept good.

BRIEF DESCRIPTION OF THE DRAWINGS

FIG. 5 is an explanatory view showing the previous value prediction step carried out on the main components, FIG. 6 is an explanatory view showing the interpolation prediction of interpolated components, FIG. 10 is an explanatory view showing how the number of image signal components is restored in the interpolation enlargement step during the extension processing shown in FIG. 7, FIGS. 11 and 12 are explanatory views showing further examples of the phase shift sampling, and FIG. 13 is an explanatory view showing the in-phase sampling.

DESCRIPTION OF THE PREFERRED EMBODIMENTS

The present invention will hereinbelow be described in further detail with reference to the accompanying drawings.

Figure 1:
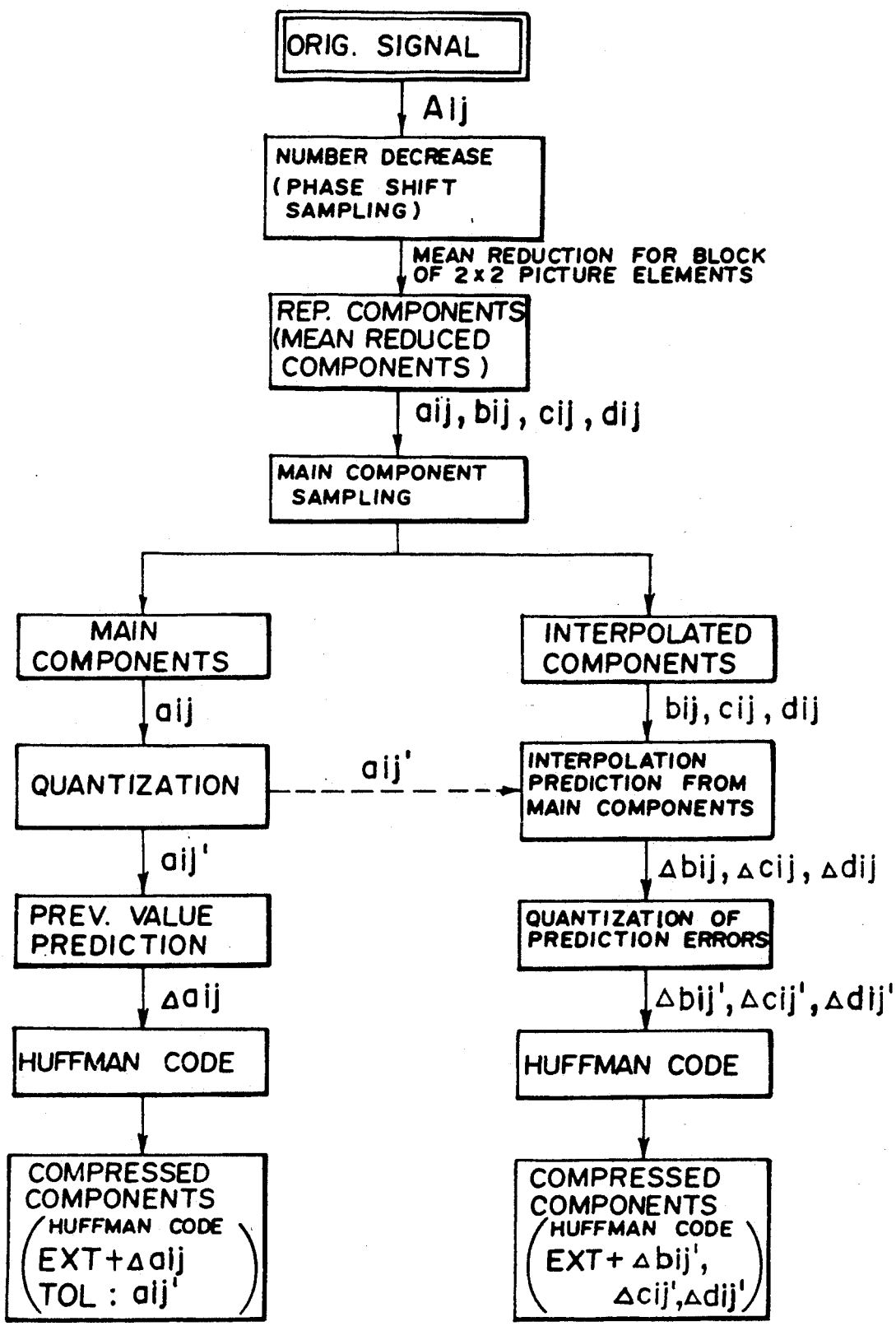
FIG. 1 is a flow chart showing an embodiment of the method or compressing an image signal in accordance with the present invention.

FIG. 1 is a flow chart showing an embodiment of the method for compressing an image signal in accordance with the present invention.

Figure 2:
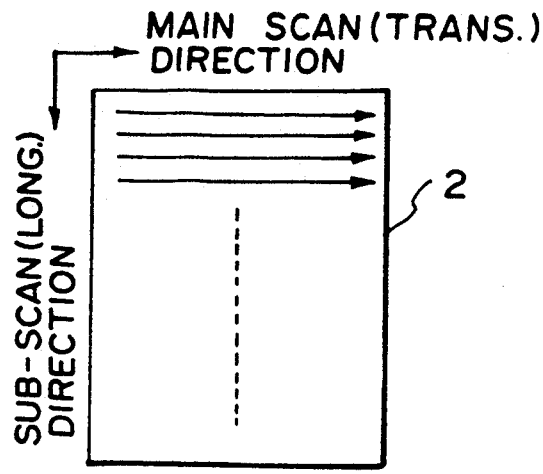
FIG. 2 is a schematic view showing how an original image signal is detected from a recording medium on which an image has been recorded.

This embodiment is applied to radiation image recording and reproducing systems wherein stimulable phosphor sheets are utilized as disclosed in, for example, U.S. Pat. No. 4,258,264 and Japanese Unexamined Patent Publication No. 56(1981)-11395. A stimulable phosphor sheet, on which a radiation image of a human body has been recorded, is scanned with a laser beam, which causes it to emit light in proportion to the amount of energy stored thereon during its exposure to radiation. The emitted light is detected as a digital image signal. The digital image signal (i.e. an original image signal) represents 2,000×2,000 picture elements and comprises an information amount of 8 bits (0 to 255 levels of density) per picture element. Specifically, as shown in FIG. 2, during an image read-out operation, a stimulable phosphor sheet 2 on which a radiation image has been stored is scanned with a laser beam along a main scanning direction (transverse direction in FIG. 2), and at the same time is moved along a sub-scanning direction (longitudinal direction in FIG. 2). In this manner, the stimulable phosphor sheet 2 is two-dimensionally scanned with the laser beam.

First, original image signal components Aij are subjected to the component number decreasing processing with which the number of the original image signal components Aij is decreased. During the component number decreasing processing, the phase shift sampling is carried out wherein the phase of the sampling is varied between sampling lines.

Figure 3:
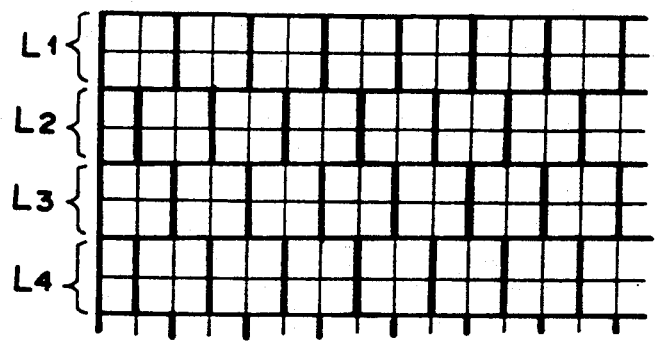
FIG. 3 is an explanatory view showing how the component number decreasing processing (phase shift sampling) is carried out in the embodiment of FIG. 1.

FIG. 3 is an explanatory view showing how the phase shift sampling is carried out in the embodiment of FIG. 1. In FIG. 3, each of the small squares represents a single picture element in an image.

With reference to FIG. 3, a mean reduction sampling process is employed. With the mean reduction sampling process, a single representative image signal component is sampled from the image signal components corresponding to each block, which comprises 2×2 picture elements, and the number of the original image signal components is decreased to one fourth. Also, the mean value of the values of the image signal components representing the four picture elements in each block is employed as the value of the representative image signal component. First, as illustrated in FIG. 3, a plurality of block lines L1, L2, L3, L4, . . . are set in parallel along the main scanning direction on the image. The width of each line, which width is taken in the sub-scanning direction, corresponds to the total width of two picture elements. A plurality of blocks, each of which comprises 2×2 picture elements, are set continuously along each block line such that the phases of the blocks located along a block line are shifted by one half of the length of a single block (i.e. a distance equal to the length of a single picture element) from the phases of the blocks located along a neighboring block line. Then, the mean value of the image signal components representing the picture elements in each block is calculated and determined as the value of the representative image signal component (mean reduced component). Only the representative image signal components thus determined for the respective blocks are sampled as new image signal components.

Figure 4:
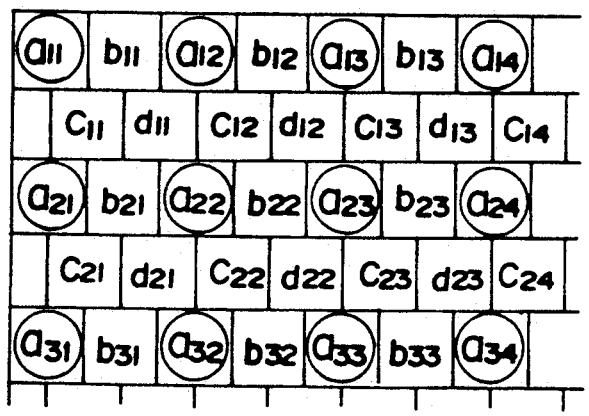
FIG. 4 is an explanatory view showing how the main components are sampled.

FIG. 4 shows the representative image signal components obtained from the aforesaid phase shift sampling. In FIG. 4, each square represents a single block comprising 2×2 picture elements, and aij, bij, cij, and dij indicated in the squares denote the representative image signal components corresponding to the respective blocks.

Thereafter, the interpolation encoding is carried out in the manner described below on the representative image signal components obtained from the aforesaid phase shift sampling.

First, the representative image signal components are classified into main components, which have been sampled at appropriate sampling intervals, and interpolated components other than the main components. In this embodiment, the main components are sampled at sampling intervals of two blocks along the transverse and longitudinal directions of the arrangement of the blocks. Therefore, in FIG. 4, the representative image signal components aij indicated by circles are sampled as the main components, and the other representative image signal components bij, cij, and dij are taken as the interpolated components.

Thereafter, a quantization process is carried out on the main components aij such that the density resolution is made coarser by 1 bit. Specifically, each of the main components aij is shifted by 1 bit toward the low order side, and the least significant bit is omitted. From the quantization, quantized main components aij' are obtained.

The quantized main components aij' corresponding to each block line are then subjected to the previous value prediction and converted into prediction errors $\Delta aij$. However, the quantized main components ai3' (j=1) corresponding to the blocks at the tops of the respective block lines remain unconverted. FIG. 5 shows the prediction errors $\Delta aij$ obtained from the previous value prediction [the quantized main components aij' (j=1) corresponding to the blocks at the tops of the respective block lines remain unconverted]. The previous value prediction errors $\Delta aij$ are represented by the formula expressed as $$\Delta aij = aij' - aij-1'$$

Specifically, they are represented by the formulas expressed as $$\Delta a_{12} = a_{12}' - a_{11}', \Delta a_{13} = a_{13}' - a_{12}', \ldots$$

$$\Delta a_{22} = a_{22}' - a_{21}', \Delta a_{23} = a_{23}' - a_{22}', \ldots$$

$$\Delta a_{32} = a_{32}' - a_{31}', \Delta a_{33} = a_{33}' - a_{32}', \ldots$$

Thereafter, the previous value prediction errors $\Delta aij$ are encoded into Huffman codes. Table 1 shows an example of the Huffman code table used for this purpose. Specifically, the previous value prediction errors $\Delta aij$, which are the objects of the encoding, are converted into the Huffman codes in accordance with the Huffman code table shown in Table 1. However, in cases where the previous value prediction errors $\Delta aij$ go beyond the range between predetermined threshold values ($\pm 7$ in the Huffman code table shown in Table 1), they are converted into the format in which they follow the extension (EXT) code, i.e. are encoded into the form of 0000001 + previous value prediction errors $\Delta aij$.

TABLE 1

| Data to be encoded | Length of code | Huffman CODE |
|---|---|---|
| −7 | 10 | 0000000001 |
| −6 | 9 | 000000001 |
| −5 | 8 | 00000001 |
| −4 | 7 | 0000010 |
| −3 | 7 | 0000011 |
| −2 | 6 | 000011 |
| −1 | 3 | 001 |
| 0 | 1 | 1 |
| 1 | 2 | 01 |
| 2 | 4 | 0001 |
| 3 | 7 | 0000101 |
| 4 | 8 | 00001000 |
| 5 | 9 | 000010010 |
| 6 | 10 | 0000100111 |
| 7 | 10 | 0000100110 |
| ext | 7 | 0000001 |

When the main components compressed in the manner described above are stored on an optical disk, or the like, the signal components corresponding to the tops of the respective block lines (TOL: TOP OF LINE) are stored in the format of the quantized main components aij' (j=1). The signal components corresponding to the other blocks are stored in the format of the Huffman codes, into which the components have been encoded in accordance with the Huffman code table shown above, and in the format of EXT code+previous value prediction errors $\Delta a_{ij}$.

Processing carried out on the interpolated components $b_{ij}$, $c_{ij}$, and $d_{ij}$ shown in FIG. 4 will be described hereinbelow.

First, the interpolation prediction from the main components is carried out on the interpolated components $b_{ij}$, $c_{ij}$, and $d_{ij}$, and interpolation prediction errors $\Delta b_{ij}$, $\Delta c_{ij}$, and $\Delta d_{ij}$ are obtained. The interpolation prediction may be carried out in one of various manners. In this embodiment, the quantized main components $a_{ij}'$ are used as the main components. Also, the interpolation prediction errors $\Delta b_{ij}$, $\Delta c_{ij}$, and $\Delta d_{ij}$ are calculated from the interpolation prediction formulas expressed as $$\Delta b_{11} = b_{11} - (a_{11'} \times 2 + a_{12'} \times 2)/2$$

$$\Delta c_{11} = c_{11} - (a_{11'} \times 2 \times 3 + a_{12'} \times 2 + a_{21'} \times 2 \times 3 + a_{22'} \times 2)/8$$

$$\Delta d_{11} = d_{11} - (a_{11'} \times 2 + a_{12'} \times 2 \times 3 + a_{21'} \times 2 + a_{22'} \times 2 \times 3)/8$$

The relationship between the positions of $a11'$, $a12'$, $a21'$, and $a22'$ and the positions of $\Delta b11$, $\Delta c11$, and $\Delta d11$ is shown in FIG. 6. The interpolation prediction errors corresponding to the other interpolated components can be calculated from the similar formulas.

Thereafter, interpolation prediction errors $\Delta b_{ij}$, $\Delta c_{ij}$, and $\Delta d_{ij}$ corresponding to the interpolated components are quantized such that the bit resolution is made coarser by 1 bit. During the quantization, the quantization characteristics A shown in Table 2 and the quantization characteristics B shown in Table 3 are utilized. The quantization characteristics A are applied to the interpolation prediction errors $\Delta b_{ij}$ corresponding to the interpolated components $b_{ij}$. The quantization characteristics B are applied to the interpolation prediction errors $\Delta c_{ij}$ and $\Delta d_{ij}$ corresponding to the interpolated components $c_{ij}$ and $d_{ij}$.

TABLE 2

| (Quantization characteristics A) | | |
|---|---|---|
| Prediction errors | After quantization | After extension |
| −255 | −128 | −256 |
| −254 | −127 | −254 |
| . | . | . |
| . | . | . |
| . | . | . |
| −3 | −2 | −4 |
| −2 | −1 | −2 |
| −1 | −1 | −2 |
| 0 | 0 | 0 |
| 1 | 0 | 0 |
| 2 | 1 | 2 |
| 3 | 1 | 2 |
| . | . | . |
| . | . | . |
| . | . | . |
| 254 | 127 | 254 |
| 255 | 127 | 254 |

TABLE 3

| (Quantization characteristics B) | | |
|---|---|---|
| Prediction errors | After quantization | After extension |
| −256 | −127 | −255 |
| −255 | −127 | −255 |
| . | . | . |
| . | . | . |
| . | . | . |

TABLE 3-continued

| (Quantization characteristics B) | | |
|---|---|---|
| Prediction errors | After quantization | After extension |
| −3 | −1 | −3 |
| −2 | −1 | −3 |
| −1 | 0 | −1 |
| 0 | 0 | −1 |
| 1 | 1 | 1 |
| 2 | 1 | 1 |
| 3 | 2 | 3 |
| . | . | . |
| . | . | . |
| . | . | . |
| 254 | 127 | 253 |
| 255 | 127 | 255 |

The quantized interpolation prediction errors $\Delta b_{ij}'$, $\Delta c_{ij}'$, and $\Delta d_{ij}'$ thus obtained are then encoded into Huffman codes. As in the case of the encoding of the main components into Huffman codes, the Huffman code table shown in table 1 is used for this purpose. Specifically, the quantized interpolation prediction errors $\Delta b_{ij}'$, $\Delta c_{ij}'$, and $\Delta d_{ij}'$, which are the objects of the encoding, are converted into the Huffman codes in accordance with the Huffman code table shown in Table 1. In cases where the quantized interpolation prediction errors $\Delta b_{ij}'$, $\Delta c_{ij}'$, and $\Delta d_{ij}'$ go beyond the range between the predetermined threshold values ±7, they are converted into the format in which they follow the extension (EXT) code, 0000001.

When the interpolated components, which have been compressed in the manner described above, are stored on an optical disk, or the like, they are stored in the format of the Huffman codes, into which they have been encoded in accordance with the Huffman code table shown above, and in the format of EXT code+quantized interpolation prediction errors $\Delta b_{ij}'$, $\Delta c_{ij}'$, and $\Delta d_{ij}'$.

How the compressed image signal is read from the optical disk, or the like, extended and used during the reproduction of a visible image will be described hereinbelow.

Figure 7:
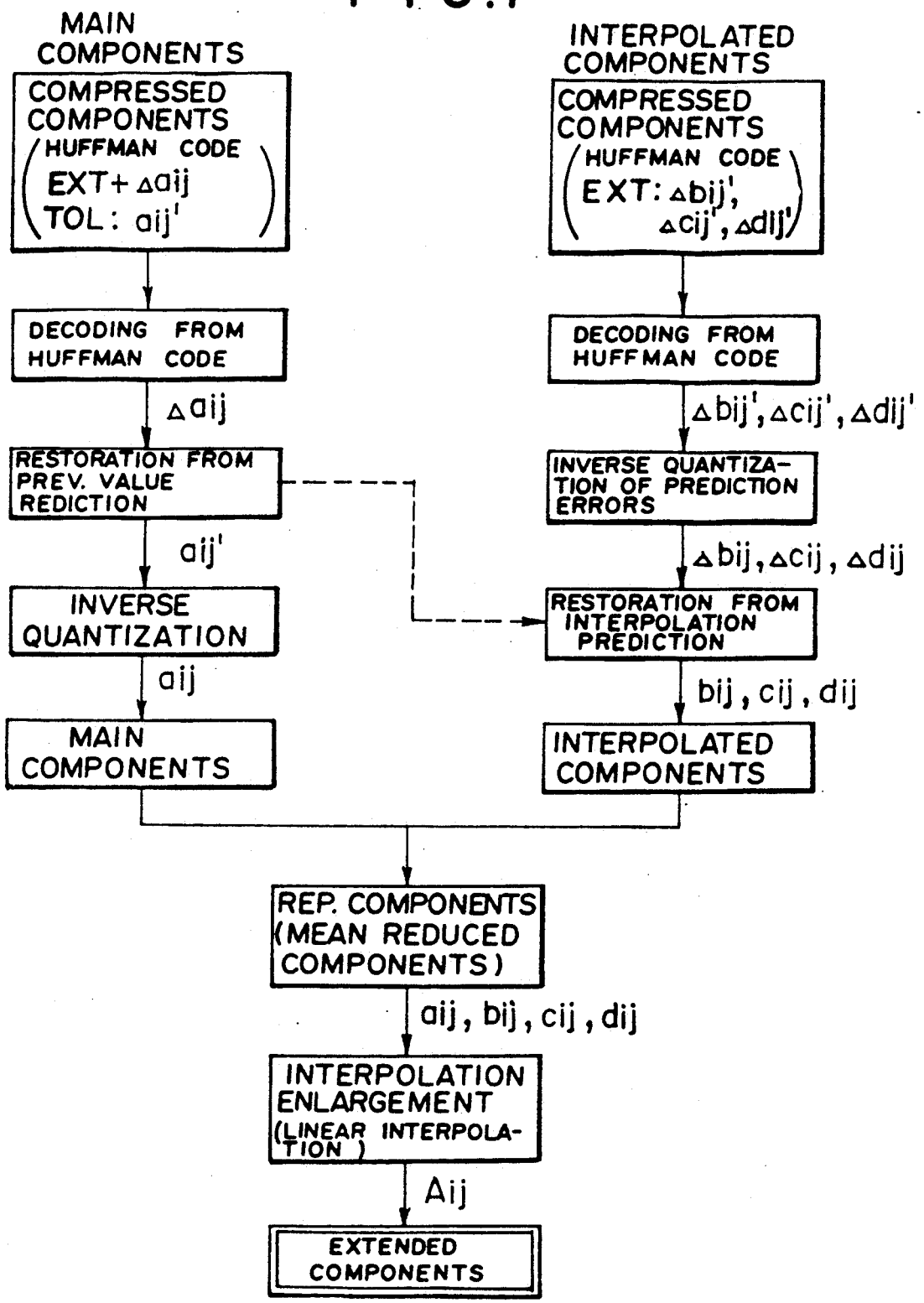
FIG. 7 is a flow chart showing how the image signal, which has been compressed in the embodiment of FIG. 1, is extended.

FIG. 7 is a flow chart showing the extension processing. The steps of the extension processing are reverse to the steps of the compression processing shown in FIG. 1.

Figure 8:
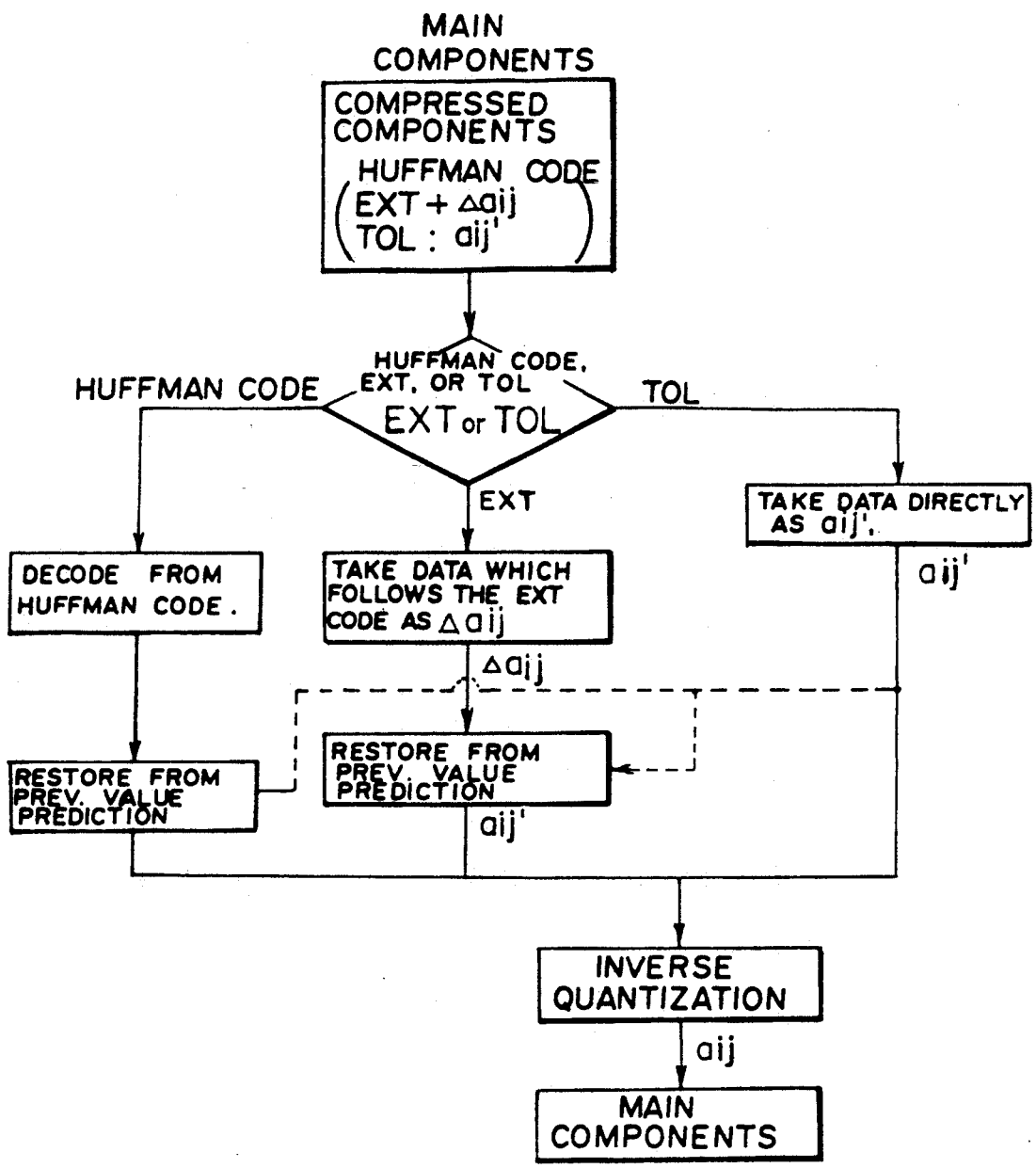
FIG. 8 is a flow chart showing part of the flow chart of FIG. 7, which part is related to the main components.

First, how the compressed main components are extended will be described hereinbelow with reference to FIG. 8.

As described above, the compressed main components are stored in the three formats: the Huffman codes, the EXT code+quantized previous value prediction errors $\Delta a_{ij}$, and the quantized main components $a_{ij}'$ corresponding to the TOL blocks. Therefore, judgment is made as to which format the compressed main components read from the storage medium have. In cases where the compressed main components read from the storage medium are those corresponding to the TOL blocks, they are directly taken as the quantized main components $a_{ij}'$.

In cases where the compressed main components read from the storage medium are the Huffman codes, they are decoded in accordance with the Huffman code table shown in Table 1 into the previous value prediction errors $\Delta a_{ij}$. Thereafter, the restoration from the previous value prediction is carried out on the previous value prediction errors $\Delta a_{ij}$, the quantized main components $a_{ij}'$ (j=1) corresponding to the TOL blocks, and the EXT code+previous value prediction errors $\Delta aij$. In this manner, the quantized main components $aij'$ are restored. The restoration from the previous value prediction is carried out from the formula expressed as $$aij' = aij-1' + \Delta aij$$

Specifically, because the quantized main components $aij'$ (j=1) corresponding to the TOL blocks have already been obtained, the formulas expressed as $$a_{12}'=a_{11}'+\Delta a_{12}, a_{13}'=a_{12}'+\Delta a_{13}, \ldots$$

$$a_{22}'=a_{21}'+\Delta a_{22}, a_{23}'=a_{22}'+\Delta a_{23}, \ldots$$

$$a_{32}'=a_{31}'+\Delta a_{32}, a_{33}'=a_{32}'+\Delta a_{33}, \ldots$$

are used.

In cases where the compressed main components read from the storage medium are the EXT code+previous value prediction errors $\Delta aij$, in the same manner as that for the Huffman codes, the quantized main components $aij'$ are restored from the previous value prediction errors $\Delta aij$ which follow the EXT code.

In the manner described above, the quantized main components $aij'$ are restored for the whole compressed image signal components. Thereafter, the quantized main components $aij'$ are subjected to inverse quantization, i.e. are shifted by 1 bit to the high order side. In this manners, the main components $aij$ (representative image signal components) are obtained.

Figure 9:
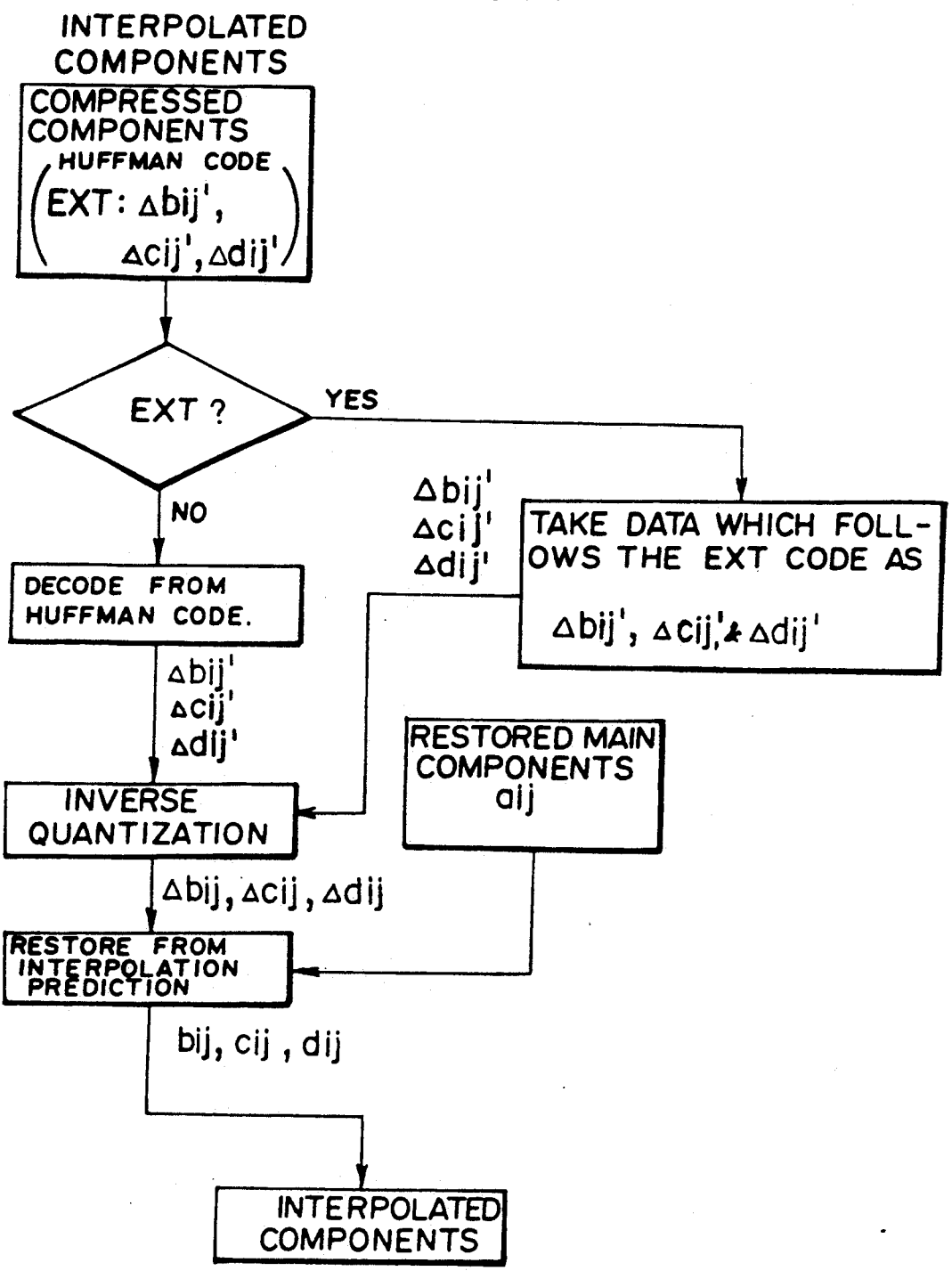
FIG. 9 is a flow chart showing part of the flow chart of FIG. 7, which part is related to the interpolated components.

How the interpolated components which have been compressed are extended will be described hereinbelow with reference to FIG. 9.

As described above, the interpolated components, which have been compressed, are stored in the two formats the Huffman codes, and the EXT code+quantized interpolation prediction errors $\Delta bij'$, $\Delta cij'$, and $\Delta dij'$. Therefore, judgment is made as to which format the compressed image signal components read from the storage medium have.

In cases where the compressed image signal components read from the storage medium are the Huffman codes, they are decoded in accordance with the Huffman code table shown in Table 1 into the quantized interpolation prediction errors $\Delta bij'$, $\Delta cij'$, and $\Delta dij'$. Thereafter, the quantized interpolation prediction errors obtained from the decoding are subjected to the inverse quantization, from which the interpolation prediction errors $\Delta bij$, $\Delta cij$, and $\Delta dij$ are obtained. The restoration from the interpolation prediction is then carried out on the interpolation prediction errors $\Delta bij$, $\Delta cij$, and $\Delta dij$ and the main components $aij$ which have already been obtained during the restoration from the previous value prediction. In this manner, the interpolated components (representative image signal components) $bij$, $cij$, and $dij$ are restored. The restoration from the interpolation prediction is carried out from the formulas expressed as $$b_{11} = \Delta b_{11} + (a_{11}+a_{12})/2$$

$$c_{11} = \Delta c_{11} + (a_{11} \times 3 + a_{12} + a_{21} \times 3 + a_{22})/8$$

$$d_{11} = \Delta d_{11} + (a_{11} + a_{12} \times + a_{21} + a_{22} \times 3)/8$$

The other 8-bit interpolated components $bij$, $cij$, and $dij$ are restored from similar formulas.

In cases where the compressed image signal components read from the storage medium are the EXT code+quantized interpolation prediction errors $\Delta bij'$, $\Delta cij'$, and $\Delta dij'$, in the same manner as that for the Huffman codes, the interpolated components $bij$, $cij$, and $dij$ are restored from the quantized interpolation prediction errors $\Delta bij'$, $\Delta cij'$, and $\Delta dij'$ which follow the EXT code.

In the manner described above, all of the representative image signal components $aij$, $bij$, $cij$, and $dij$ comprising the main components and the interpolated components are restored. Thereafter, as shown in FIG. 7, interpolation enlargement is carried out on the representative image signal components $aij$, $bij$, $cij$, and $dij$ such that the number of the image signal components is increased to four times as large as the number of the representative image signal components $aij$, $bij$, $cij$, and $dij$. In this manner, the extended image signal components $Aij$ corresponding to the original image signal are restored. Thereafter, by way of example, a visible image is reproduced from the extended image signal components $Aij$ on a CRT display device, or the like.

How the interpolation enlargement (restoring interpolation) is carried out on the representative image signal components $aij$, $bij$, $cij$, and $dij$ will be described hereinbelow with reference to FIG. 10. In FIG. 10, each square represents a single picture element. By way of example, as illustrated, the representative image signal components $aij$, $bij$, $cij$, and $dij$ which has been restored are set as the extended image signal components $Aij$ representing the left, upper picture elements of the corresponding blocks. From the extended image signal components $Aij$ thus set, the other extended image signal components $Aij$ are restored. For this purpose, the linear interpolation is carried out along the main scanning direction and the sub-scanning direction. For example, the extended image signal components $A12$, $A22$, $A23$, and $A33$ are restored from the formulas expressed as $$A_{12}=(a_{11}+b_{11})/2$$

$$A_{22}=(A_{12}+c_{11})/2=\{(a_{11}+b_{11})/2+c_{11}\}/2$$

$$A_{33}=(c_{11}+d_{11})/2$$

$$A_{23}=(b_{11}+A_{33})/2=\{b_{11}+(c_{11}+d_{11})/2\}/2$$

The other extended image signal components $Aij$ can be restored in the same manner.

In the aforesaid embodiment, smoothing processing may be carried out before the component number decreasing processing. As one of the smoothing processing techniques, for example, moving average filter processing may be employed. With the moving average filter processing, a mask having a size corresponding to, for example, 3×3 picture elements is prepared. The mask is located so that its center coincides with a remark picture element. The mean value of the values of the image signal components representing the nine picture elements included in the mask is taken as the value of a new image signal component corresponding to the remark picture element. Such processing is carried out for every picture element.

With the smoothing processing, the correlation between the image signal components representing the neighboring picture elements can be improved. As a result, the extent of concentration of prediction errors, which occur during the previous value prediction and the interpolation prediction, at values near zero can be made high, and the signal compressibility can be kept high.

In cases where the interpolation encoding processing is carried out after the component number decreasing processing is carried out with the phase shift sampling, wherein the phases of the sampling points along a sampling line ar shifted from the phases of the sampling points along a neighboring sampling line, the image signal compressibility can be kept higher than when the interpolation encoding processing is carried out after the component number decreasing processing is carried out with the in-phase sampling, in which the phases of the sampling points along a sampling line are not shifted from those along a neighboring sampling line. This is presumably because, when the values of the interpolated components are predicted with the interpolation prediction from the main components, which have been sampled with the phase shift sampling, a higher accuracy of prediction of the values of the interpolated components can be achieved than when the interpolation prediction is carried out from the main components, which have been sampled with the in-phase sampling.

The inventor carried out study about a difference in signal compressibility between the compression technique, wherein the interpolation encoding processing is carried out after the component number decreasing processing is carried out with the phase shift sampling, and the compression technique, wherein the interpolation encoding processing is carried out after the component number decreasing processing is carried out with the in-phase sampling. The results of the study will be described hereinbelow.

In the study, more than 100 images of various parts of a human body were recorded and read out in the same manner as that for the object image in the aforesaid embodiment. The image signals thus obtained were subjected to the two aforesaid compression techniques.

The compression technique utilizing the phase shift sampling and the interpolation encoding was carried out in the same manner as that in the aforesaid embodiment. As for the compression technique utilizing the in-phase sampling and the interpolation encoding, as shown in FIG. 13, blocks each of which comprised 2×2 picture elements were set such that the phases of the blocks located along a block line coincide with the phases of the blocks located along a neighboring block line. The main components ($a_{ij}$) were sampled at sampling intervals of two blocks along the row and the column of the array of the blocks. The other components ($b_{ij}$, $c_{ij}$, $d_{ij}$) were set as the interpolated components. The interpolation prediction errors were calculated from the formulas expressed as $$\Delta b_{11} = b_{11} - (a_{11} + a_{12})/2$$

$$\Delta c_{11} = c_{11} - (a_{11} + a_{21})/2$$

$$\Delta d_{11} = d_{11} - (a_{11} + a_{12} + a_{21} + a_{22})/4$$

Operations other than the calculation of the interpolation prediction errors were carried out in the same manner as that for the compression technique utilizing the phase shift sampling and the interpolation encoding.

Table 4 shows the results of the study.

TABLE 4

| | Entropy in phase shift sampling | Entropy in in-phase sampling |
|---|---|---|
| MAIN COMPONENTS | | |
| $a_{ij}$ | 2.25 | 2.25 |
| INTERPOLATED COMPONENTS | | |
| $b_{ij}$ | 1.36 | 1.36 |
| $c_{ij}$ | 1.41 | 1.53 |
| $d_{ij}$ | 1.33 | 1.49 |
| TOTAL | 1.59 | 1.65 |

Entropy: Logical limit (shortest code length) during the encoding into Huffman codes, or the like.

Table 4 lists the mean values for the images used during the study. As will be clear from Table 4, when the phase shift sampling is employed, the entropy decreases (i.e. the compressibility can be increased) by approximately 8% for the interpolated components $c_{ij}$, by approximately 11% for the interpolated components $d_{ij}$, and by a total of approximately 4%. As for the in-phase sampling, the entropy differs between the interpolated components $b_{ij}$ and $c_{ij}$. This is because an image is obtained from the read-out operation wherein a stimulable phosphor sheet is scanned with a laser beam in the transverse direction (main scanning direction) and is moved in the longitudinal direction (sub-scanning direction).

As described above, the signal compressibility can be increased when the component number decreasing processing, in which the phase shift sampling is utilized, is employed. Also, when the phase shift sampling is employed, the coarseness of a visible image reproduced from an image signal restored from the compressed image signal can be kept visually less perceptible and the apparent sharpness of the visible image can be kept higher than when the in-phase sampling is employed. Additionally, in cases where a stationary grid was used during the recording of an image on a recording medium in order to prevent scattered light or radiation from impinging upon the recording medium, if the number of the image signal components of the image signal detected from the recording medium is decreased with the in phase sampling, a moire pattern will easily occur in a reproduced visible image. However, when the component number decreasing processing, in which the phase shift sampling is utilized, is employed, such a moire pattern does not occur in the reproduced visible image. Therefore, the image quality of a reproduced visible image can be kept good.

In the aforesaid embodiment, each block comprises 2×2 picture elements. However, each block may be composed of n×n picture elements, where n≧3. Also, instead of the mean value of the values of the image signal components corresponding to each block being set as the representative image signal component for the block, the value of an image signal component representing a picture element located at a specific position in each block may be employed as the representative image signal component for the block.

In the embodiment described above, the blocks each of which comprises 2×2 picture elements are set continuously. However, for example, as indicated by the hatching in FIG. 11 (wherein each square represents a single picture element), blocks each of which comprises 2×2 picture elements may be set at predetermined intervals. In FIG. 11, the blocks are set at intervals equal to the length of a single block.

Also, instead of being constituted of a plurality of picture elements, each block may be constituted of a single picture element. In such cases, as indicated by the hatching in FIG. 12 (wherein each square represents a single picture element), it is necessary for the blocks to be set at predetermined intervals along each block line.

In the aforesaid embodiment, during the interpolation encoding, the main components are sampled from the representative image signal components at sampling intervals of two blocks along the transverse and longitudinal directions of the arrangement of the blocks. The sampling intervals may be set arbitrarily. Also, the sampling intervals along the transverse direction of the arrangement of the blocks and the sampling intervals along the longitudinal direction of the arrangement of the blocks may be different from each other.

Also, in the aforesaid embodiment, the main components are subjected to the quantization and the combination of the prediction value prediction with the encoding into the Huffman codes. However, the main components may not be subjected to any particular processing. Alternatively, the main components may be subjected to other appropriate types of processing. The quantization may be carried out in any of various other manners. Also, the prediction errors found during the previous value prediction may be quantized.

In the embodiment described above, the quantization of the interpolation prediction errors is carried out for the interpolated components. This quantization step may be omitted. Alternatively, the interpolated components themselves may be subjected to the quantization. Also, the interpolation prediction may be carried out in a different manner (with other interpolation prediction formulas). Any of code tables other than the Huffman code table may be used during the encoding of the interpolation prediction errors.

The method for compressing an image signal in accordance with the present invention may be embodied in various other manners.

I claim:

1. A method for compressing an image signal, which comprises the steps of:
   i) subjecting an original image signal made up of a series of image signal components representing an image to a component number decreasing process which comprises the steps of:
      a) electronically superimposing a plurality of block lines in parallel on an image, each block comprising a plurality of picture elements in said image, wherein each said picture element is associated with an image signal component, arranging said blocks continuously or at predetermined intervals, shifting said blocks such that the phases of the blocks located along a block line are shifted by at least a distance equal to a length of a single picture element from the phases of the blocks located along a neighboring block line such that said neighboring block lines are out of phase, and
      b) combining said image signal components that are associated with said plurality of picture elements within each said block through a predetermined process thereby determining a representative image signal component for each said block, said representative image signal component being indicative of all image signal components in each said block,
   ii) classifying said representative image signal components, which have been determined from said component number decreasing processing, into main components, which have been sampled at appropriate sampling intervals, and interpolated components other than said main components, and
   iii) subjecting said interpolated components to interpolation prediction encoding processing based on said main components.

2. A method as defined in claim 1 wherein interpolation prediction errors obtained during said interpolation prediction encoding processing are encoded into Huffman codes.

3. A method as defined in claim 1 wherein said main components are subjected to previous value prediction processing.

4. A method as defined in claim 3 wherein previous value prediction errors obtained during said previous value prediction processing are encoded into Huffman codes.

5. A method as defined in claim 1 wherein said image is a radiation image.

6. A method as defined in claim 5 wherein said radiation image is stored on a stimulable phosphor sheet.

7. The method for compressing an image signal as claimed in claim 1, wherein said predetermined process is a mean reduction sampling process, wherein said representative image signal component for each said block is equal to a mean value of the values of said image signal components representing said plurality of picture elements in each said block.

* * * * *